(12) United States Patent
Wan et al.

(10) Patent No.: US 12,147,370 B2
(45) Date of Patent: Nov. 19, 2024

(54) PCIe-BASED DATA TRANSMISSION METHOD, APPARATUS, AND SYSTEM

(71) Applicant: Huawei Technologies Co., Ltd., Shenzhen (CN)

(72) Inventors: Lei Wan, Beijing (CN); Pengxin Bao, Chengdu (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/870,485

(22) Filed: Jul. 21, 2022

(65) Prior Publication Data

US 2022/0365899 A1    Nov. 17, 2022

Related U.S. Application Data

(63) Continuation of application No. PCT/CN2020/073922, filed on Jan. 22, 2020.

(51) Int. Cl.
*G06F 13/42* (2006.01)

(52) U.S. Cl.
CPC .. *G06F 13/4221* (2013.01); *G06F 2213/0026* (2013.01)

(58) Field of Classification Search
CPC ......... G06F 13/4295; G06F 2213/0026; G06F 13/42; G06F 13/4221; H04L 9/40
See application file for complete search history.

(56) References Cited

U.S. PATENT DOCUMENTS

| | | | |
|---|---|---|---|
| 5,473,691 A | 12/1995 | Menezes et al. | |
| 8,139,575 B2 | 3/2012 | Biran et al. | |
| 9,280,290 B2 | 3/2016 | Feehrer et al. | |
| 10,423,552 B2 | 9/2019 | Harriman | |
| 2003/0123484 A1 | 7/2003 | Harriman | |
| 2003/0126281 A1 | 7/2003 | Harriman | |
| 2003/0163303 A1* | 8/2003 | Du | H04S 3/008 |
| | | | 704/201 |
| 2005/0238038 A1 | 10/2005 | Keller et al. | |
| 2006/0153078 A1 | 7/2006 | Yasui | |
| 2006/0161707 A1 | 7/2006 | Davies et al. | |
| 2007/0147426 A1 | 6/2007 | Sharma et al. | |
| 2007/0130397 A1 | 7/2007 | Tsu | |

(Continued)

FOREIGN PATENT DOCUMENTS

| CN | 1608255 A | 4/2005 |
|---|---|---|
| CN | 1608256 A | 4/2005 |

(Continued)

OTHER PUBLICATIONS

Wagh Mahesh: "PCIe 3.0/2.1 Protocol Update," Dec. 31, 2011, pp. 1-35, XP055980142, 35 pages.

(Continued)

*Primary Examiner* — Phong H Dang
(74) *Attorney, Agent, or Firm* — Conley Rose, P.C.

(57) ABSTRACT

A Peripheral Component Interconnect Express (PCIe)-based data transmission method includes that a first node obtains a transaction layer packet (TLP), where the TLP includes data, a type field, and at least one reserved bit, the type field and the at least one reserved bit indicate a first parameter set, and the first parameter set includes a data type of the data, and the first node sends the TLP to a second node.

20 Claims, 12 Drawing Sheets

| Fmt<br>3 bits | Type<br>5 bits | T9<br>1 bit | TC<br>3 bits | T8<br>1 bit | Attr<br>1 bit | LN<br>1 bit | TH<br>1 bit | TD<br>1 bit | EP<br>1 bit | Attr<br>2 bits | AT<br>2 bits | Length<br>10 bits |
|---|---|---|---|---|---|---|---|---|---|---|---|---|
| Byte 4 to byte 7 (byte 4 to byte 7): defined based on a service type | | | | | | | | | | | | |
| Byte 8 to byte 11 (byte 8 to byte 11): content to be filled varies with a routing manner | | | | | | | | | | | | |
| Byte 12 to byte 15 (byte 12 to byte 15): content to be filled varies with a routing manner | | | | | | | | | | | | |

(56) References Cited

U.S. PATENT DOCUMENTS

| | | | |
|---|---|---|---|
| 2007/0168644 | A1 | 7/2007 | Hummel et al. |
| 2009/0006932 | A1* | 1/2009 | Biran .................. G06F 13/4282 |
| | | | 714/E11.032 |
| 2009/0296740 | A1* | 12/2009 | Wagh ...................... H04L 69/22 |
| | | | 370/475 |
| 2010/0329255 | A1* | 12/2010 | Singhal ................... H04L 69/04 |
| | | | 370/392 |
| 2012/0017025 | A1 | 1/2012 | Luk et al. |
| 2014/0181354 | A1 | 6/2014 | Yi et al. |
| 2014/0281104 | A1 | 9/2014 | Raskin |
| 2014/0372660 | A1 | 12/2014 | Jones et al. |
| 2015/0227312 | A1 | 8/2015 | Feehrer et al. |
| 2016/0041936 | A1 | 2/2016 | Lee et al. |
| 2016/0371221 | A1 | 12/2016 | Rosenberg et al. |
| 2017/0220494 | A1 | 8/2017 | Shacham et al. |
| 2018/0095817 | A1 | 4/2018 | Zhang et al. |
| 2018/0101498 | A1 | 4/2018 | Cosby et al. |
| 2018/0307648 | A1 | 10/2018 | Shakamuri et al. |
| 2019/0037052 | A1* | 1/2019 | Deshpande ........... H04L 65/611 |
| 2019/0108156 | A1 | 4/2019 | Lee et al. |
| 2019/0278485 | A1* | 9/2019 | Benisty ................. G06F 3/0659 |
| 2019/0324930 | A1 | 10/2019 | Liu et al. |
| 2020/0226091 | A1* | 7/2020 | Harriman ............ G06F 13/4282 |
| 2022/0358070 | A1 | 11/2022 | Wan et al. |

FOREIGN PATENT DOCUMENTS

| | | |
|---|---|---|
| CN | 1953461 A | 4/2007 |
| CN | 101594306 A | 12/2009 |
| CN | 101681325 A | 3/2010 |
| CN | 102821082 A | 12/2012 |
| CN | 103003808 A | 3/2013 |
| CN | 103023824 A | 4/2013 |
| CN | 103117929 A | 5/2013 |
| CN | 103490852 A | 1/2014 |
| CN | 103532807 A | 1/2014 |
| CN | 103701680 A | 4/2014 |
| CN | 105185414 A | 12/2015 |
| CN | 105205021 A | 12/2015 |
| CN | 105335227 A | 2/2016 |
| CN | 105653481 A | 6/2016 |
| CN | 107656884 A | 2/2018 |
| CN | 107771325 A | 3/2018 |
| CN | 110389711 A | 10/2019 |
| CN | 113498600 A | 10/2021 |
| EP | 3489836 A1 | 5/2019 |
| EP | 3311295 B1 | 12/2019 |
| WO | 2015016882 A1 | 2/2015 |

OTHER PUBLICATIONS

PCI Express Base Specification Revision 5.0, Version 1.0, May 22, 2019, 1299 pages.

Jason Lawley, "Understanding Performance of PCI Express Systems", White Paper: UltraScale and Virtex-7 FPGAs, WP350 (v1.2) Oct. 28, 2014, 16 pages.

Qiu Xuehong et al., "Microcomputer Principles and Interface Technology (Third Edition)", Xidian University Press, ISBN978-7-5606-3834-8, Jun. 2016, with an English abstract, 10 pages.

Shi Dong et al., "Design of High Speed Image Transmission System Based on Double DMA Buffer", Chinese Journal of Electron Devices, vol. 41, No. 6, Dec. 2018, with an English machine translation, 12 pages.

\* cited by examiner

| Fmt 3 bits | Type 5 bits | T9 1 bit | TC 3 bits | T8 1 bit | Attr 1 bit | LN 1 bit | TH 1 bit | TD 1 bit | EP 1 bit | Attr 2 bits | AT 2 bits | Length 10 bits |
|---|---|---|---|---|---|---|---|---|---|---|---|---|
| | | | | Byte 4 to byte 7 (byte 4 to byte 7): defined based on a service type | | | | | | | | |
| | | | | Byte 8 to byte 11 (byte 8 to byte 11): content to be filled varies with a routing manner | | | | | | | | |
| | | | | Byte 12 to byte 15 (byte 12 to byte 15): content to be filled varies with a routing manner | | | | | | | | |

FIG. 4

Step 501: A first node obtains a TLP. The TLP includes data, a type field, and at least one reserved bit, the type field and the at least one reserved bit indicate a first parameter set, and the first parameter set includes a data type of the data Step 502: The first node sends the TLP to a second node

FIG. 5

| Fmt 3 bits | First parameter set | | | | | | | | | |
|---|---|---|---|---|---|---|---|---|---|---|
| | TC 3 bits | T8 1 bit | Attr 1 bit | LN 1 bit | TH 1 bit | TD 1 bit | EP 1 bit | Attr 2 bits | AT 2 bits | Length 10 bits |
| | Byte 4 to byte 7: defined based on a service type | | | | | | | | | |
| | Byte 8 to byte 11: content to be filled varies with a routing manner | | | | | | | | | |
| | Byte 12 to byte 15: content to be filled varies with a routing manner | | | | | | | | | |

FIG. 6

| Fmt 3 bits | First parameter set | | | | | | | | | |
|---|---|---|---|---|---|---|---|---|---|---|
| | TC 3 bits | T8 1 bit | Attr 1 bit | LN 1 bit | TH 1 bit | TD 1 bit | EP 1 bit | Attr 2 bits | AT 2 bits | Length 10 bits |
| | Byte 4 to byte 7: defined based on a service type | | | | | | | | | |
| | Identification information of a source node and a second attribute parameter | | | | | | | | | |
| | Identification information of a target node and a second attribute parameter | | | | | | | | | |

FIG. 7

Step 801: A switching node receives a first TLP, where the first TLP includes data, a type field, and at least one reserved bit, the type field and the at least one reserved bit indicate a first parameter set, and the first parameter set includes a data type of the data Step 802: The switching node sends a second TLP to a target node of the first TLP based on the first TLP

FIG. 8

Step 901: A second node receives a TLP from a first node, where the TLP includes data, a type field, and at least one reserved bit, the type field and the at least one reserved bit indicate a first parameter set, and the first parameter set includes a data type of the data Step 902: The second node obtains the data based on the first parameter set

FIG. 9

| Fmt 3 bits | Data type being security | T9 1 bit | TC 3 bits | Message type | Attr 1 bit | LN 1 bit | TH 1 bit | TD 1 bit | EP 1 bit | Attr 2 bits | AT 2 bits | Length 10 bits |
|---|---|---|---|---|---|---|---|---|---|---|---|---|

Byte 4 to byte 7: defined based on a service type

Byte 8 to byte 11: content to be filled varies with a routing manner

Byte 12 to byte 15: content to be filled varies with a routing manner

FIG. 12

PCIe-BASED DATA TRANSMISSION METHOD, APPARATUS, AND SYSTEM

CROSS-REFERENCE TO RELATED APPLICATIONS

This is a continuation of International Patent Application No. PCT/CN2020/073922 filed on Jan. 22, 2020, which is hereby incorporated by reference in its entirety.

TECHNICAL FIELD

This disclosure relates to the field of communications technologies, and in particular, to a Peripheral Component Interconnect Express (PCIe)-based data transmission method, an apparatus, and a system.

BACKGROUND

PCIe is a high-speed short-range communications interface, and is widely used in devices such as computers and test instruments. A PCIe system mainly includes a root node (root), a switching node (switch), and an endpoint. The root is responsible for managing all buses and nodes in the PCIe system, and is a bridge for communication between a central processing unit (CPU) and the endpoint in the PCIe system. The switch serves as a data forwarding node, and is connected to another switch and an endpoint. The endpoint is an end device, for example, a peripheral. In the PCIe system, endpoints cannot directly communicate with each other, but require the root for communication.

The mechanism in which the endpoints communicate with each other through the root in the PCIe system results in a plurality of transmission interfaces in an intra-vehicle network, and interface conversion is required for information exchange between the interfaces. The conversion between different interfaces greatly increases complexity of the intra-vehicle network, especially in a high-speed communication scenario. This affects security and reliability of the PCIe system.

SUMMARY

Embodiments of this disclosure provide a PCIe-based data transmission method, an apparatus, and a system, to resolve a problem that communication between endpoints depends on a root.

According to a first aspect, this disclosure provides a PCIe-based data transmission method, and the method includes that a first node obtains a transaction layer packet (TLP), and the first node sends the TLP to a second node. The TLP includes data, a type field, and at least one reserved bit, the type field and the at least one reserved bit indicate a first parameter set, and the first parameter set includes a data type of the data.

According to the foregoing method, the type field and the at least one reserved bit indicate the first parameter set, so that a TLP header supports the data type, and endpoints in a PCIe system can communicate with each other without using a root. This can increase redundancy of the PCIe system and improve security and reliability of the PCIe system.

In a possible design, the first parameter set further includes one or more first attribute parameters corresponding to the data type.

According to the foregoing design, the type field and the at least one reserved bit indicate the first parameter set, so that the TLP header supports the one or more first attribute parameters corresponding to the data type.

In a possible design, the type field and the at least one reserved bit are jointly coded, and the type field and the at least one reserved bit jointly indicate the first parameter set.

According to the foregoing design, the type field and the at least one reserved bit may be used for indication in a joint coding manner.

In a possible design, the type field and the at least one reserved bit are separately coded, and a parameter indicated by the type field is different from a parameter indicated by the at least one reserved bit.

For example, that the parameter indicated by the type field is different from the parameter indicated by the at least one reserved bit may include the following several possible forms: 1. The type field indicates the data type of the data, and the at least one reserved bit indicates the one or more first attribute parameters corresponding to the data type. 2. The at least one reserved bit indicates the data type of the data, and the type field indicates the one or more first attribute parameters corresponding to the data type. 3. The type field indicates the data type of the data and one or more first attribute parameters corresponding to the data type, and the at least one reserved bit indicates one or more first attribute parameters corresponding to the data type. The first attribute parameter indicated by the type field is different from the first attribute parameter indicated by the at least one reserved bit. 4. The at least one reserved bit indicates the data type of the data and one or more first attribute parameters corresponding to the data type, and the type field indicates one or more first attribute parameters corresponding to the data type. The first attribute parameter indicated by the type field is different from the first attribute parameter indicated by the at least one reserved bit.

According to the foregoing design, the type field and the at least one reserved bit may be used for indication in a separate coding manner.

In a possible design, a value of the type field is a reserved value.

According to the foregoing design, compatibility with an existing TLP format can be achieved, and an original function of PCIe is not affected.

In a possible design, some bytes in a byte 4 to a byte 11 or some bytes in a byte 4 to a byte 15 in a TLP header of the TLP indicate a second parameter set, and the second parameter set includes one or more second attribute parameters corresponding to the data type.

It should be understood that the second attribute parameter is different from the first attribute parameter. For example, when a data type corresponds to a large quantity of attribute parameters, these attribute parameters may be divided into two parts, where one part is first attribute parameters and the other part is second attribute parameters. Therefore, the attribute parameters corresponding to the data type may include one or more first attribute parameters, or one or more first attribute parameters and one or more second attribute parameters. The one or more first attribute parameters may be indicated by a type field and at least one reserved bit, and the one or more second attribute parameters may be indicated by some bytes in a byte 4 to a byte 11 or some bytes in a byte 4 to a byte 15 in a TLP header.

According to the foregoing design, some bytes in the byte 4 to the byte 11 or some bytes in the byte 4 to the byte 15 in the TLP header may indicate the one or more second attribute parameters corresponding to the data type, so that idle bits in the TLP header can be fully utilized.

In a possible design, the data type is one or more of image, audio, control-type information, stream write (SWRITE), and security.

In a possible design, the first node is a first endpoint, and the second node is a second endpoint, or the first node is a first endpoint, and the second node is a first switching node, or the first node is a first switching node, and the second node is a first endpoint, or the first node is a first switching node, and the second node is a second switching node.

According to the foregoing design, the method provided in this disclosure may be applied to a plurality of possible communication scenarios.

According to a second aspect, this disclosure provides a PCIe-based data transmission method, and the method includes that a switching node receives a first TLP, and the switching node sends a second TLP to a target node of the first TLP based on the first TLP. The first TLP includes data, a type field, and at least one reserved bit, the type field and the at least one reserved bit indicate a first parameter set, and the first parameter set includes a data type of the data.

According to the foregoing method, the type field and the at least one reserved bit indicate the first parameter set, so that a TLP header supports the data type, and endpoints in a PCIe system can communicate with each other without using a root. This can increase redundancy of the PCIe system and improve security and reliability of the PCIe system.

In a possible design, the second TLP includes content of the data or the data.

In a possible design, the first parameter set further includes one or more first attribute parameters corresponding to the data type.

According to the foregoing design, the type field and the at least one reserved bit indicate the first parameter set, so that the TLP header supports the one or more first attribute parameters corresponding to the data type.

In a possible design, the type field and the at least one reserved bit are jointly coded, and the type field and the at least one reserved bit jointly indicate the first parameter set.

According to the foregoing design, the type field and the at least one reserved bit may be used for indication in a joint coding manner.

In a possible design, the type field and the at least one reserved bit are separately coded, and a parameter indicated by the type field is different from a parameter indicated by the at least one reserved bit.

For example, that the parameter indicated by the type field is different from the parameter indicated by the at least one reserved bit may further include the following several possible forms: 1. The type field indicates the data type of the data, and the at least one reserved bit indicates the one or more first attribute parameters corresponding to the data type. 2. The at least one reserved bit indicates the data type of the data, and the type field indicates the one or more first attribute parameters corresponding to the data type. 3. The type field indicates the data type of the data and one or more first attribute parameters corresponding to the data type, and the at least one reserved bit indicates one or more first attribute parameters corresponding to the data type. The first attribute parameter indicated by the type field is different from the first attribute parameter indicated by the at least one reserved bit. 4. The at least one reserved bit indicates the data type of the data and one or more first attribute parameters corresponding to the data type, and the type field indicates one or more first attribute parameters corresponding to the data type. The first attribute parameter indicated by the type field is different from the first attribute parameter indicated by the at least one reserved bit.

According to the foregoing design, the type field and the at least one reserved bit may be used for indication in a separate coding manner.

In a possible design, a value of the type field is a reserved value.

According to the foregoing design, compatibility with an existing TLP format can be achieved, and an original function of PCIe is not affected.

In a possible design, some bytes in a byte 4 to a byte 11 or some bytes in a byte 4 to a byte 15 in a TLP header of the TLP indicate a second parameter set, and the second parameter set includes one or more second attribute parameters corresponding to the data type.

It should be understood that the second attribute parameter is different from the first attribute parameter. For example, when a data type corresponds to a large quantity of attribute parameters, these attribute parameters may be divided into two parts, where one part is first attribute parameters and the other part is second attribute parameters. Therefore, the attribute parameters corresponding to the data type may include one or more first attribute parameters, or one or more first attribute parameters and one or more second attribute parameters. The one or more first attribute parameters may be indicated by a type field and at least one reserved bit, and the one or more second attribute parameters may be indicated by some bytes in a byte 4 to a byte 11 or some bytes in a byte 4 to a byte 15 in a TLP header.

According to the foregoing design, some bytes in the byte 4 to the byte 11 or some bytes in the byte 4 to the byte 15 in the TLP header may indicate the one or more second attribute parameters corresponding to the data type, so that idle bits in the TLP header can be fully utilized.

In a possible design, the data type is one or more of image, audio, control-type information, SWRITE, and security.

According to a third aspect, this disclosure provides a PCIe-based data transmission method, and the method includes that a second node receives a TLP from a first node, where the TLP includes data, a type field, and at least one reserved bit, the type field and the at least one reserved bit indicate a first parameter set, and the first parameter set includes a data type of the data, and the second node obtains the data in the TLP based on the first parameter set.

According to the foregoing method, the type field and the at least one reserved bit indicate the first parameter set, so that a TLP header supports the data type, and endpoints in a PCIe system can communicate with each other without using a root. This can increase redundancy of the PCIe system and improve security and reliability of the PCIe system.

In a possible design, the first parameter set further includes one or more first attribute parameters corresponding to the data type.

According to the foregoing design, the type field and the at least one reserved bit indicate the first parameter set, so that the TLP header supports the one or more first attribute parameters corresponding to the data type.

In a possible design, the type field and the at least one reserved bit are jointly coded, and the type field and the at least one reserved bit jointly indicate the first parameter set.

According to the foregoing design, the type field and the at least one reserved bit may be used for indication in a joint coding manner.

In a possible design, the type field and the at least one reserved bit are separately coded, and a parameter indicated by the type field is different from a parameter indicated by the at least one reserved bit.

For example, that the parameter indicated by the type field is different from the parameter indicated by the at least one reserved bit may include the following several possible forms: 1. The type field indicates the data type of the data, and the at least one reserved bit indicates the one or more first attribute parameters corresponding to the data type. 2. The at least one reserved bit indicates the data type of the data, and the type field indicates the one or more first attribute parameters corresponding to the data type. 3. The type field indicates the data type of the data and one or more first attribute parameters corresponding to the data type, and the at least one reserved bit indicates one or more first attribute parameters corresponding to the data type. The first attribute parameter indicated by the type field is different from the first attribute parameter indicated by the at least one reserved bit. 4. The at least one reserved bit indicates the data type of the data and one or more first attribute parameters corresponding to the data type, and the type field indicates one or more first attribute parameters corresponding to the data type. The first attribute parameter indicated by the type field is different from the first attribute parameter indicated by the at least one reserved bit.

According to the foregoing design, the type field and the at least one reserved bit may be used for indication in a separate coding manner.

In a possible design, a value of the type field is a reserved value.

According to the foregoing design, compatibility with an existing TLP format can be achieved, and an original function of PCIe is not affected.

In a possible design, some bytes in a byte 4 to a byte 11 or some bytes in a byte 4 to a byte 15 in a TLP header of the TLP indicate a second parameter set, and the second parameter set includes one or more second attribute parameters corresponding to the data type. The second node obtains the data in the TLP based on the first parameter set and the second parameter set.

It should be understood that the second attribute parameter is different from the first attribute parameter. For example, when a data type corresponds to a large quantity of attribute parameters, these attribute parameters may be divided into two parts, where one part is first attribute parameters and the other part is second attribute parameters. Therefore, the attribute parameters corresponding to the data type may include one or more first attribute parameters, or one or more first attribute parameters and one or more second attribute parameters. The one or more first attribute parameters may be indicated by a type field and at least one reserved bit, and the one or more second attribute parameters may be indicated by some bytes in a byte 4 to a byte 11 or some bytes in a byte 4 to a byte 15 in a TLP header.

According to the foregoing design, some bytes in the byte 4 to the byte 11 or some bytes in the byte 4 to the byte 15 in the TLP header may indicate the one or more second attribute parameters corresponding to the data type, so that idle bits in the TLP header can be fully utilized.

In a possible design, the data type is one or more of image, audio, control-type information, SWRITE, and security.

In a possible design, the first node is a first endpoint, and the second node is a second endpoint, or the first node is a first endpoint, and the second node is a first switching node, or the first node is a first switching node, and the second node is a first endpoint, or the first node is a first switching node, and the second node is a second switching node.

According to the foregoing design, the method provided in this disclosure may be applied to a plurality of possible communication scenarios.

According to a fourth aspect, an embodiment of this disclosure provides a communications apparatus, and the apparatus may be a first node, or may be a chip in the first node. The apparatus may include a processing unit, a sending unit, and a receiving unit. It should be understood that the sending unit and the receiving unit herein may alternatively be a transceiver unit. When the apparatus is the first node, the processing unit may be a processor, and the sending unit and the receiving unit may be a transceiver. The first node may further include a storage unit, and the storage unit may be a memory. The storage unit is configured to store instructions. The processing unit executes the instructions stored in the storage unit, so that the first node performs the method according to any one of the first aspect or the possible designs of the first aspect. When the apparatus is the chip in the first node, the processing unit may be a processor, and the sending unit and the receiving unit may be an input/output interface, a pin, a circuit, or the like. The processing unit executes instructions stored in a storage unit, so that the chip performs the method according to any one of the first aspect or the possible designs of the first aspect. The storage unit is configured to store the instructions, and the storage unit may be a storage unit (for example, a register or a cache) in the chip, or a storage unit (for example, a read-only memory (ROM) or a random-access memory (RAM)) that is in the first node and that is located outside the chip.

According to a fifth aspect, an embodiment of this disclosure provides a communications apparatus, and the apparatus may be a switching node, or may be a chip in the switching node. The apparatus may include a processing unit, a sending unit, and a receiving unit. It should be understood that the sending unit and the receiving unit herein may alternatively be a transceiver unit. When the apparatus is the switching node, the processing unit may be a processor, and the sending unit and the receiving unit may be a transceiver. The terminal device may further include a storage unit, and the storage unit may be a memory. The storage unit is configured to store instructions, and the processing unit executes the instructions stored in the storage unit, so that the terminal device performs the method according to any one of the second aspect or the possible designs of the second aspect. When the apparatus is the chip in the switching node, the processing unit may be a processor, and the sending unit and the receiving unit may be an input/output interface, a pin, a circuit, or the like. The processing unit executes instructions stored in a storage unit, so that the chip performs the method according to any one of the second aspect or the possible designs of the second aspect. The storage unit is configured to store the instructions. The storage unit may be a storage unit (for example, a register or a cache) in the chip, or may be a storage unit (for example, a ROM or a RAM) that is in the terminal device and that is located outside the chip.

According to a sixth aspect, an embodiment of this disclosure provides a communications apparatus, and the apparatus may be a second node, or may be a chip in the second node. The apparatus may include a processing unit, a sending unit, and a receiving unit. It should be understood that the sending unit and the receiving unit herein may alternatively be a transceiver unit. When the apparatus is the second node, the processing unit may be a processor, and the sending unit and the receiving unit may be a transceiver. The terminal device may further include a storage unit, and the storage unit may be a memory. The storage unit is configured to store instructions, and the processing unit executes the instructions stored in the storage unit, so that the terminal device performs the method according to any one of the third aspect or the possible designs of the third aspect. When the apparatus is the chip in the second node, the processing unit may be a processor, and the sending unit and the receiving unit may be an input/output interface, a pin, a circuit, or the like. The processing unit executes instructions stored in a storage unit, so that the chip performs the method according to any one of the third aspect or the possible designs of the third aspect. The storage unit is configured to store the instructions. The storage unit may be a storage unit (for example, a register or a cache) in the chip, or may be a storage unit (for example, a ROM or a RAM) that is in the terminal device and that is located outside the chip.

According to a seventh aspect, an embodiment of this disclosure further provides a computer-readable storage medium. The computer-readable storage medium stores a computer program or instructions. When the computer program or the instructions are run on a computer, the computer is enabled to perform the method according to the first aspect to the third aspect.

According to an eighth aspect, an embodiment of this disclosure further provides a computer program product that includes a program. When the computer program product runs on a computer, the computer is enabled to perform the method according to the first aspect to the third aspect.

According to a ninth aspect, an embodiment of this disclosure further provides a communications apparatus, and the communications apparatus includes a processor, where the processor is coupled to a memory. The memory is configured to store computer-executable instructions, and the processor is configured to execute the computer-executable instructions stored in the memory, so that the communications apparatus performs the method according to the first aspect to the third aspect.

According to a tenth aspect, an embodiment of this disclosure further provides a communications apparatus, and the communications apparatus includes a processor and an interface circuit. The interface circuit is configured to receive code instructions and transmit the code instructions to the processor. The processor runs the code instructions to perform the method according to the first aspect to the third aspect.

According to an eleventh aspect, an embodiment of this disclosure further provides a communications system, and the communications system includes at least one first node, at least one switching node, and at least one second node. The first node performs the method according to the first aspect, the switching node performs the method according to the second aspect, and the second node performs the method according to the third aspect.

According to a twelfth aspect, an embodiment of this disclosure further provides a communications system, and the communications system includes at least one first node and at least one second node. The first node performs the method according to the first aspect, and the second node performs the method according to the third aspect.

BRIEF DESCRIPTION OF DRAWINGS

FIG. 4 is a schematic diagram of a structure of a TLP header according to this disclosure;

FIG. 5 is a first overview flowchart of a PCIe-based data transmission method according to this disclosure;

FIG. 6 is a schematic diagram in which a type field and T9 indicate a first parameter set according to this disclosure;

FIG. 7 is a schematic diagram in which some bytes in a byte 4 to a byte 11 or some bytes in a byte 4 to a byte 15 in a TLP header indicate a second parameter set according to this disclosure;

FIG. 8 is a second overview flowchart of a PCIe-based data transmission method according to this disclosure;

FIG. 9 is a second overview flowchart of a PCIe-based data transmission method according to this disclosure;

FIG. 12 is a schematic diagram in which a type field and T8 indicate a first parameter set according to this disclosure;

DESCRIPTION OF EMBODIMENTS

The following describes embodiments of this disclosure with reference to accompanying drawings.

Embodiments of this disclosure may be applied to a PCIe system, and the PCIe system may be applied to scenarios such as an intra-vehicle network, an automated production line, and a data center. It should be understood that the following application scenario examples are not intended to limit this disclosure.

Figure 1:
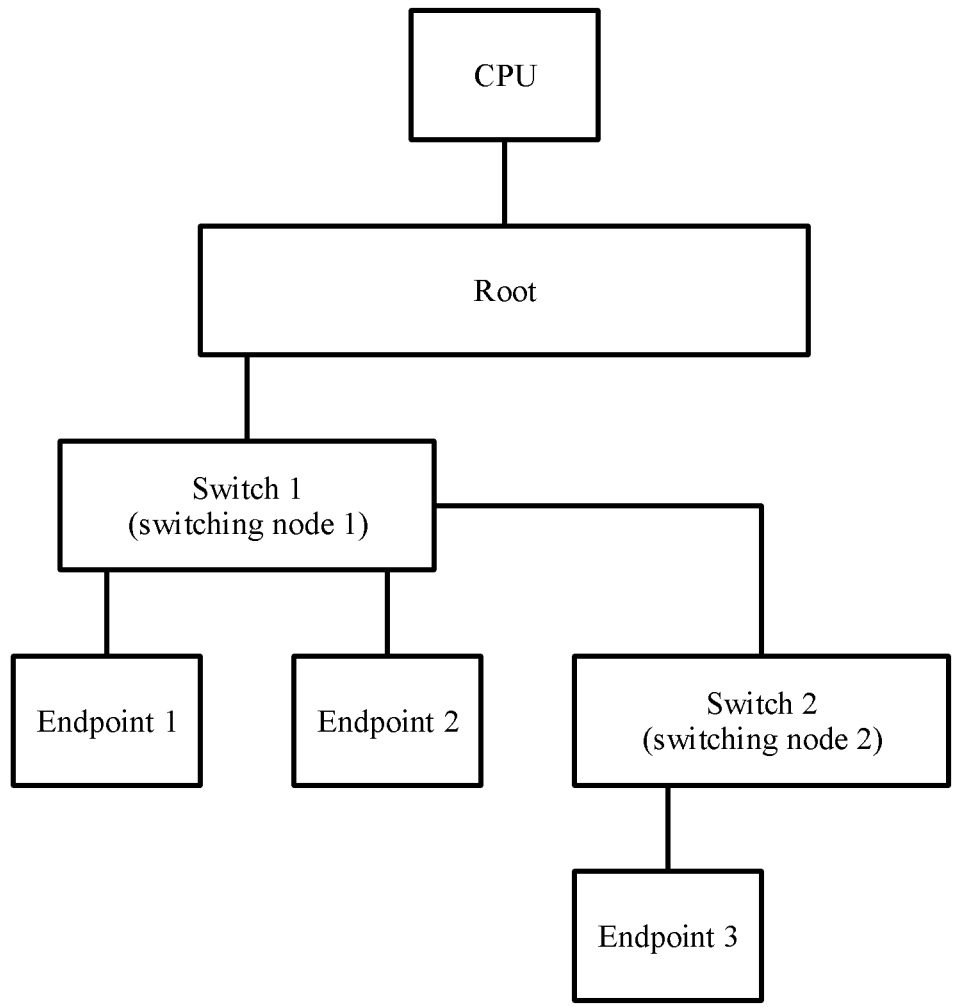
FIG. 1 is a first schematic diagram of a typical PCIe system architecture according to this disclosure.

In a possible application scenario, FIG. 1 shows a typical PCIe system architecture. As shown in FIG. 1, the PCIe system includes a root, a switch 1, a switch 2, an endpoint 1, an endpoint 2, and an endpoint 3. The endpoint 1 and the endpoint 2 are connected to the switch 1, and the endpoint 3 is connected to the switch 2. It should be noted that a CPU does not belong to the PCIe system, and an interface between the CPU and the root is not a PCIe interface.

Figure 2:
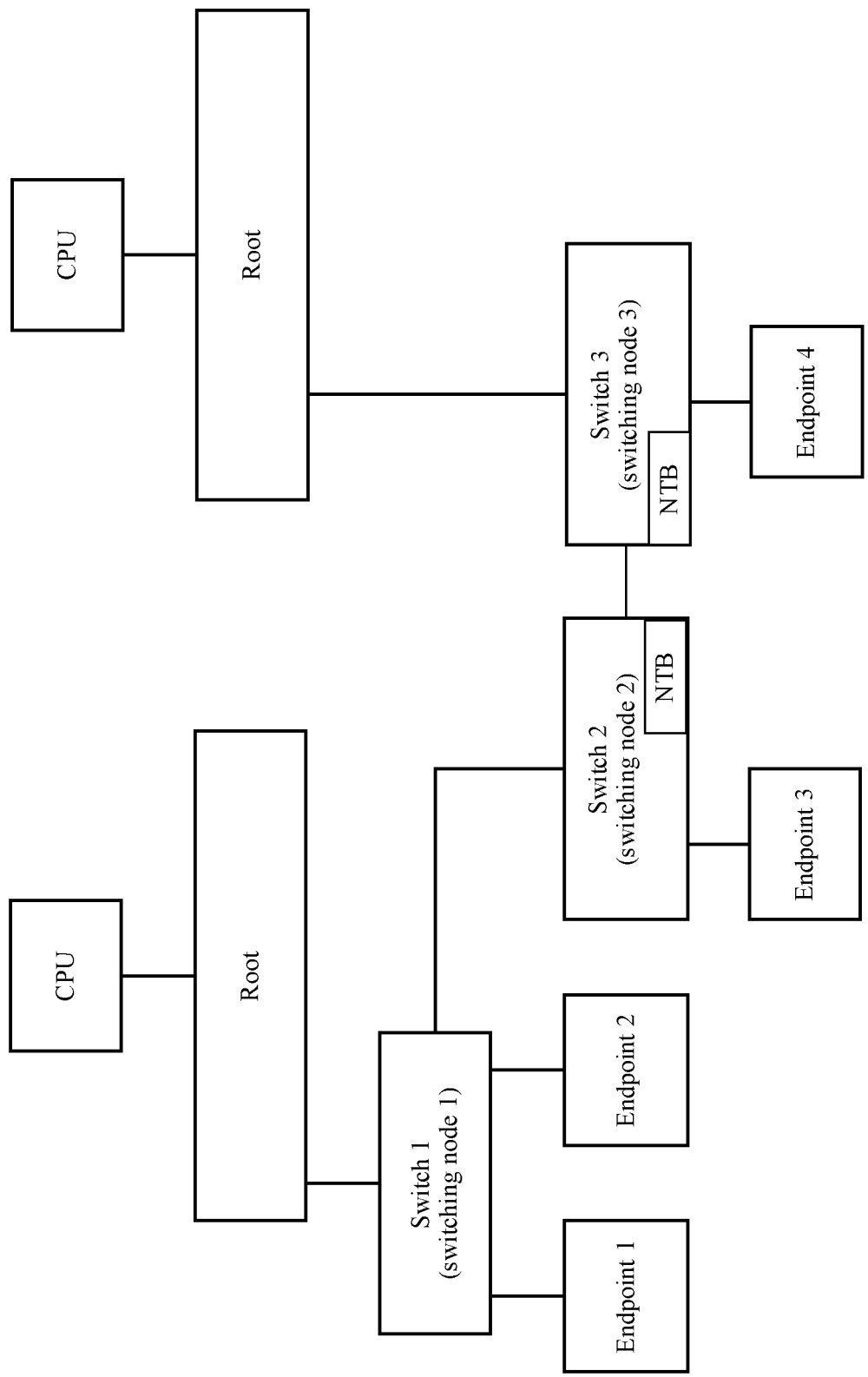
FIG. 2 is a second schematic diagram of a typical PCIe system architecture according to this disclosure.

In another possible application scenario, as shown in FIG. 2, two PCIe systems are connected through switches with a non-transparent bridge (NTB). An endpoint 1, an endpoint 2, an endpoint 3, a switch 1, and a switch 2 are managed by a root 1 (depicted as root on the left-hand side of FIG. 2), and an endpoint 4 and a switch 3 are managed by a root 2 (depicted as root on the right-hand side of FIG. 2). The root 1 and the switches and the endpoints that are managed by the root 1 belong to one PCIe system. The root 2 and the switch and the endpoint that are managed by the root 2 belong to one PCIe system. Because addresses and identifiers (IDs) are independently allocated in the two PCIe systems, the two PCIe systems need to be connected through the NTB. Further, the NTB is configured to connect the two PCIe systems. Because a device in each PCIe system is independently managed by a corresponding root, addresses and IDs of devices in different PCIe systems may conflict with each other. To enable the two PCIe systems to be connected and communicate with each other normally, bridging and transformation need to be performed between the two PCIe systems to translate addresses or IDs.

In still another possible application scenario, a ring-shaped intra-vehicle network requires that a sensor be directly connected to a gateway, and data of the sensor is exchanged, forwarded, and transmitted to different computation units or display units through the gateway or a switch on the ring-shaped intra-vehicle network. An architecture of the foregoing ring-shaped intra-vehicle network requires that the data of the sensor can be forwarded in any direction through the gateway or the switch, to provide communication link redundancy, so as to ensure in-vehicle function security. However, if the ring-shaped intra-vehicle network is networked with a PCIe system, there are a plurality of transmission interfaces in the ring-shaped intra-vehicle network and interface conversion is required for information exchange between various transmission interfaces because communication between endpoints in the PCIe system needs to be performed through a root. Especially in a high-speed communication scenario, information exchange between the plurality of transmission interfaces greatly increases complexity of the ring-shaped intra-vehicle network, and increases a delay of data transmission. Therefore, to apply the PCIe system to the foregoing ring-shaped intra-vehicle network scenario, the PCIe system needs to support communication between endpoints without using a root.

Figure 3:
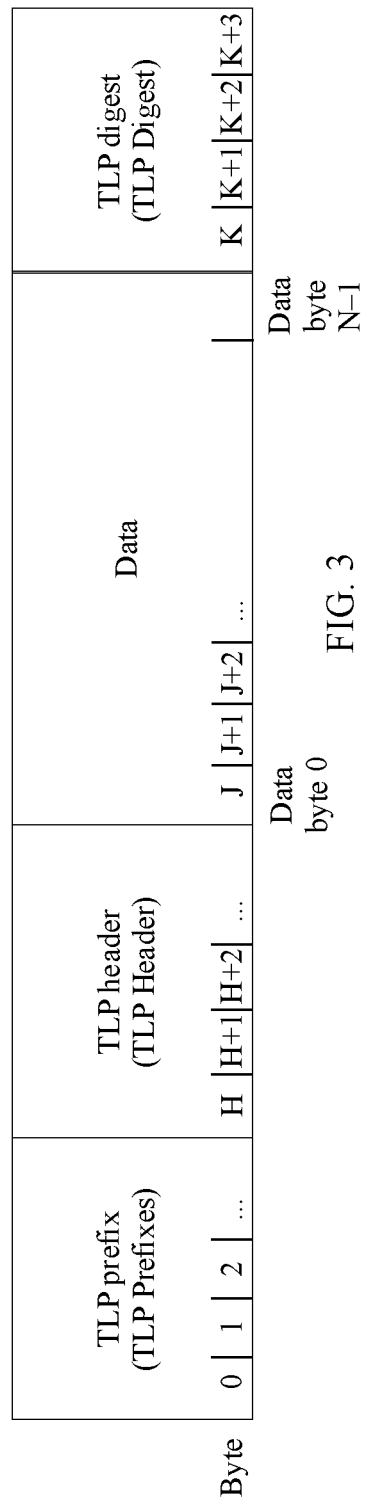
FIG. 3 is a schematic diagram of a structure of a TLP according to this disclosure.

In an existing PCIe protocol, a data packet used to transmit data is referred to as a transaction layer packet (TLP). A structure of the TLP is shown in FIG. 3, and the TLP includes four parts: a TLP prefix, a TLP header, data (i.e., data payload), and a TLP digest. The TLP prefix is an optional part, and has a length of H bytes, where H is an integer greater than 0. A length of the TLP header is 12 bytes or 16 bytes, and the TLP header is used to indicate information such as a PCIe service type. A length of the data payload ranges from 0 bytes to 4K bytes. The TLP digest is an optional part, and content of the TLP digest may be an end-to-end cyclic redundancy check (ECRC), which is used to check whether TLP transmission is correct. A length of the TLP digest is 4 bytes.

A structure of the TLP header is shown in FIG. 4. The following briefly describes each field in the TLP header.

Format (Fmt) field: A format field occupies 3 bits, supports indication of eight types, and is used to indicate the length of the TLP header and whether the TLP has a data payload. In the existing PCIe protocol, a total of five types of this field are used, and three types are reserved. The length of the TLP header has two cases: 12 bytes or 16 bytes. Whether the TLP includes the data payload has two cases. Therefore, a total of four types of this field are used to indicate combinations of the foregoing cases, and another type is used to indicate whether the TLP prefix is included. When the TLP includes the TLP prefix, the Fmt field indicates that the TLP includes the TLP prefix. When the TLP does not include the TLP prefix, the Fmt field indicates that the TLP does not include the TLP prefix.

Type field: A type field occupies 5 bits, and supports indication of 32 types. In the existing PCIe protocol, 19 types are used to indicate a service type of a TLP. There are six PCIe service types: memory read/write, input/output (I/O) read/write, configuration read/write, message request, completion, and atomic operation.

T9 and T8: Each of T9 and T8 occupies 1 bit, which is a reserved bit.

Traffic class (TC) field: A traffic class field is used to indicate a scheduling priority.

Attributes (Attr) field: An attributes field is used to indicate a TLP attribute. For example, the TLP attribute may be ordering, hardware coherency management (snoop), or the like.

Lightweight notification (LN) field: A lightweight indication is a simple read/write manner defined by PCIe.

TLP processing hints (TH) field: A TLP processing hints field is used to indicate whether there is processing hints (PH) at a tail of the TLP header.

TLP digest indication (indicates presence of TLP Digest (TD)) field: A TLP digest indication field is used to indicate whether a TLP tail includes a TLP digest.

Poisoned data (EP): A poisoned data field is used to indicate whether the data is poisoned data.

Address type (AT): An address type field is used to indicate whether an address needs to be translated.

Length: A length field is used to indicate a data payload length, and may use 4 bytes as a minimum unit.

Byte 4 to byte 7: The byte 4 to the byte 7 are defined based on a service type.

Byte 8 to byte 15: Content to be filled varies with a routing manner. For example, a memory address or an endpoint ID of an endpoint mapped to a CPU is filled.

In a PCIe system, a root can read configuration space of an endpoint, to learn of a function of the endpoint, and a data type and a data format that are of data sent by the endpoint. Neither of another endpoint and a switch has permission to read the configuration space. Therefore, endpoints cannot communicate with each other directly. The root is required to implement communication between endpoints. For example, in FIG. 1, although the endpoint 1 and the endpoint 2 are connected to the switch 1, the endpoint 1 and the endpoint 2 cannot directly communicate with each other through the switch 1. The endpoint 1 needs to first communicate with the root, to find the endpoint 2 through the root. Therefore, a working mechanism of the existing PCIe system has a relatively large limitation, and communication between endpoints depends on the root.

Based on this, to resolve a problem that communication between endpoints depends on a root, an embodiment of this disclosure provides a PCIe-based data transmission method. As shown in FIG. 5, the method includes the following steps.

Step 501: A first node obtains a TLP. The TLP includes data, a type field, and at least one reserved bit, the type field and the at least one reserved bit indicate a first parameter set, and the first parameter set includes a data type of the data.

The data type of the data may be one or more of image, audio, control-type information, SWRITE, and security. For example, if the first node is a camera, the data type of the data that needs to be transmitted by the first node may be image, or image and audio. For another example, if the first node is a sensor, the data type of the data that needs to be transmitted by the first node may be security.

In a possible design, the first parameter set further includes one or more first attribute parameters corresponding to the data type. It should be understood that the first attribute parameter corresponding to the data type may be used to indicate a data format of the data. Different data types are usually corresponding to different first attribute parameters.

If the data type is image, attribute parameters corresponding to the data type being image may include parameters such as an image data type, a pixel quantization depth, resolution, and segment indication information, and the first attribute parameter corresponding to the data type being image may include one or more of the foregoing parameters.

The image data type includes RAW, red, green, and blue (RGB), luma, blue projection, and red projection (YUV), embedded data, or the like. The pixel quantization depth includes 12 bits, 20 bits, 24 bits, or the like. The resolution includes 1080P, 2K, 4K, or the like. An image sensor outputs one row of images at a time. For a high-resolution image, the TLP cannot be used to transmit one row of images at a time, and the row of images needs to be classified into several TLP packets for transmission. For example, the segment indication information may indicate a specific segment of a current row that a current TLP is, and may further include a specific rule for segmenting images. For example, the rule may be even segmentation and three TLPs are used to transmit one row of images.

If the data type is audio, attribute parameters corresponding to the data type being audio may include parameters such as a sampling quantization format, a sampling frequency, a quantization depth, and a quantity of sound channels (or a quantity of channels), and the first attribute parameter corresponding to the data type being audio may include one or more of the foregoing parameters. The sampling quantization format includes floating-point quantization, integer quantization, or the like. The sampling frequency includes 24 kilohertz (kHz), 48 kHz, or the like. The quantization depth includes 8 bits, 12 bits, or the like. The quantity of sound channels (or the quantity of channels) is a quantity of sound channels (or channels) included in current data.

If the data type is control-type information, attribute parameters corresponding to the data type being control-type information may include parameters such as a control-type information type and a quantity of each type of control-type information, and the first attribute parameter corresponding to the data type being control-type information may include one or more of the foregoing parameters. The control-type information type includes Inter-Integrated Circuit (I2C), general-purpose input/output (GPIO), serial peripheral interface (SPI), or the like. For example, the quantity of each type of control-type information may indicate that the current data packet includes three I2Cs or eight GPIOs.

If the data type is security, attribute parameters corresponding to the data type being security may include parameters such as a message type and a format indication, and the first attribute parameter corresponding to the data type being security may include one or more of the foregoing parameters. The message type is a type of a message that needs to be exchanged for establishing a secure channel, and the format indication may indicate how to divide bits in data into groups, a meaning of each bit group, and the like.

If the data type is SWRITE, attribute parameters corresponding to the data type being SWRITE may include parameters such as an alignment manner, and the first attribute parameter corresponding to the data type being SWRITE may include one or more of the foregoing parameters. For example, the alignment manner may be alignment using 4 bytes or 8 bytes as a minimum unit.

The type field and the at least one reserved bit may indicate the first parameter set in, but not limited to, the following manners.

Manner 1: The type field and the at least one reserved bit are jointly coded, and the type field and the at least one reserved bit jointly indicate the first parameter set.

For example, two reserved bits are used. A result of joint coding of the type field and the two reserved bits is 0000100. 0000100 indicates that resolution is 2K, a pixel quantization depth is 24 bits, an image data type is RGB, segment indication information includes even segmentation, and three TLPs are used to transmit one row of images. First five bits correspond to the type field, and last two bits correspond to the two reserved bits. In addition, the foregoing result of joint coding also indicates that a data type of data included in the TLP is image.

Therefore, in the foregoing manner 1, each result of joint coding corresponds to a group of predefined parameters (that is, a first parameter set), and a sending endpoint and a receiving endpoint may agree on a joint coding scheme in advance. Further, the sending endpoint determines, based on the data type of the data in the TLP that needs to be sent and the one or more first attribute parameters (that is, the first parameter set) corresponding to the data type, a result of joint coding of the type field and the at least one reserved bit corresponding to the first parameter set. After parsing out the result of joint coding of the type field and the at least one reserved bit, the receiving endpoint obtains the first parameter set based on the result of joint coding.

Manner 2: The type field and the at least one reserved bit are separately coded, and a parameter indicated by the type field is different from a parameter indicated by the at least one reserved bit.

The manner 2 may include the following several possible forms.

1. The type field indicates the data type of the data, and the at least one reserved bit indicates the one or more first attribute parameters corresponding to the data type.

2. The at least one reserved bit indicates the data type of the data, and the type field indicates the one or more first attribute parameters corresponding to the data type.

3. The type field indicates the data type of the data and one or more first attribute parameters corresponding to the data type, and the at least one reserved bit indicates one or more first attribute parameters corresponding to the data type.

The first attribute parameter indicated by the type field is different from the first attribute parameter indicated by the at least one reserved bit. For example, the type field indicates that the data type is image and indicates an image data type, and two reserved bits respectively indicate a pixel quantization depth and resolution.

4. The at least one reserved bit indicates the data type of the data and one or more first attribute parameters corresponding to the data type, and the type field indicates one or more first attribute parameters corresponding to the data type.

Similarly, the first attribute parameter indicated by the type field is different from the first attribute parameter indicated by the at least one reserved bit.

For example, the type field indicates a pixel quantization depth and an image data type, and the at least one reserved bit indicates that the data type is image and indicates segment indication information (for example, even segmentation is indicated and three TLPs are used to transmit one row of images).

In a possible design, in the foregoing manner 1 and manner 2, a value of the type field is a reserved value. Therefore, compatibility with an existing TLP format can be achieved, and an original function of PCIe is not affected.

As shown in FIG. 6, according to the method in the manner 1 or the manner 2, the type field and T9 indicate the first parameter set.

In addition, in a possible design, some bytes in a byte 4 to a byte 11 or some bytes in a byte 4 to a byte 15 in a TLP header of the TLP indicate a second parameter set, and the second parameter set includes one or more second attribute parameters corresponding to the data type, as shown in FIG. 7.

It should be understood that, generally, the second attribute parameter is different from the first attribute parameter. For example, when a data type corresponds to a large quantity of attribute parameters, these attribute parameters may be divided into two parts, where one part is first attribute parameters and the other part is second attribute parameters. Therefore, the attribute parameters corresponding to the data type may include one or more first attribute parameters, or one or more first attribute parameters and one or more second attribute parameters. The one or more first attribute parameters may be indicated by a type field and at least one reserved bit, and the one or more second attribute parameters may be indicated by some bytes in a byte 4 to a byte 11 or some bytes in a byte 4 to a byte 15 in a TLP header.

For example, if the data type is audio, two first attribute parameters corresponding to the data type being audio may include a sampling quantization format and a sampling frequency, and two second attribute parameters corresponding to the data type being audio may include a quantization depth and a quantity of sound channels (or a quantity of channels).

In a possible design, the TLP further includes identification information of a source node of the TLP and identification information of a target node of the TLP, that is, identification information of the first node and identification information of a second node. The identification information of the first node may be an identifier or an address of the first node, and the identification information of the second node may be an identifier or an address of the second node.

It should be understood that, the identification information of the source node of the TLP and the identification information of the target node of the TLP occupy some bytes in a byte 8 to the byte 11 or a byte 8 to the byte 15. In addition to the identification information of the source node of the TLP and the identification information of the target node of the TLP, remaining bytes in the byte 8 to the byte 11 or the byte 8 to the byte 15 may be used to indicate the one or more second attribute parameters in the second parameter set.

Step 502: The first node sends the TLP to the second node.

The first node and the second node may be in the following several possible combinations.

The first node is a first endpoint, and the second node is a second endpoint, which indicates communication between endpoints, or the first node is a first endpoint, and the second node is a first switching node, or the first node is a first switching node, and the second node is a first endpoint, or the first node is a first switching node, and the second node is a second switching node, which indicates communication between switching nodes.

For example, as shown in FIG. 1, the first node may be the endpoint 1, and the second node may be the switch 1. Alternatively, the first node may be the switch 1, and the second node may be the endpoint 1. Alternatively, the first node may be the switch 1, and the second node may be the switch 2.

In conclusion, according to the method provided in this embodiment of this disclosure, the type field and the at least one reserved bit indicate the first parameter set, so that the TLP header supports indication of the data type and indication of the attribute parameters corresponding to the data type, and endpoints in a PCIe system can communicate with each other without using a root. This can increase redundancy of the PCIe system and improve security and reliability of the PCIe system.

An embodiment of this disclosure provides a PCIe-based data transmission method. As shown in FIG. 8, the method includes the following steps.

Step 801: A switching node receives a first TLP, where the first TLP includes data, a type field, and at least one reserved bit, the type field and the at least one reserved bit indicate a first parameter set, and the first parameter set includes a data type of the data.

For example, the first TLP herein may be a TLP sent by an endpoint to the current switching node, or a TLP sent by another switching node to the current switching node.

It should be understood that, for a specific indication method in which the type field and the at least one reserved bit in the first TLP indicate the first parameter set, specific content of the data type and one or more first attribute parameters corresponding to the data type, and a specific indication method of a second parameter set, refer to specific content in step 501. Repeated content is not described again.

Step 802: The switching node sends a second TLP to a target node of the first TLP based on the first TLP.

For example, after receiving the first TLP, the switching node parses the type field in the first TLP, and determines that a value of the type field is a reserved value. In this case, the switching node parses a byte 8 to a byte 11 or a byte 8 to a byte 15, determines an identifier of the target node of the first TLP, determines a routing path based on the identifier of the target node of the first TLP, and sends the second TLP based on the routing path.

It should be understood that the second TLP may be the same as the first TLP, or the second TLP may be different from the first TLP. The second TLP includes the data in the first TLP or content of the data in the first TLP.

For example, the switching node may modify identification information of a source node of the first TLP in the first TLP to identification information of the switching node, that is, the second TLP includes the identification information of the switching node and identification information of the target node of the first TLP. For example, as shown in FIG. 1, the endpoint 1 sends a first TLP to the switch 1, and the first TLP includes identification information of the endpoint 1 and identification information of the endpoint 2. The switch 1 sends a second TLP to the endpoint 2, and the second TLP includes identification information of the switch 1 and the identification information of the endpoint 2. In addition, other content included in the second TLP may be the same as content of a corresponding part in the first TLP.

Advantages of this embodiment of this disclosure are similar to those of the foregoing embodiments, and details are not described again.

An embodiment of this disclosure provides a PCIe-based data transmission method. As shown in FIG. 9, the method includes the following steps.

Step 901: A second node receives a TLP from a first node, where the TLP includes data, a type field, and at least one reserved bit, the type field and the at least one reserved bit indicate a first parameter set, and the first parameter set includes a data type of the data.

It should be understood that, for a specific indication method in which the type field and the at least one reserved bit in the TLP indicate the first parameter set, specific content of the data type and one or more first attribute parameters corresponding to the data type, and a specific indication method of a second parameter set, refer to specific content in step 501. Repeated content is not described again.

Step 902: The second node obtains the data based on the first parameter set.

In addition, when some bytes in a byte 4 to a byte 11 or some bytes in a byte 4 to a byte 15 in a TLP header of the TLP indicate the second parameter set, the second node obtains the data based on the first parameter set and the second parameter set.

Advantages of this embodiment of this disclosure are similar to those of the foregoing embodiments, and details are not described again.

The following describes the foregoing embodiments with reference to specific examples.

Example 1

Figure 10:
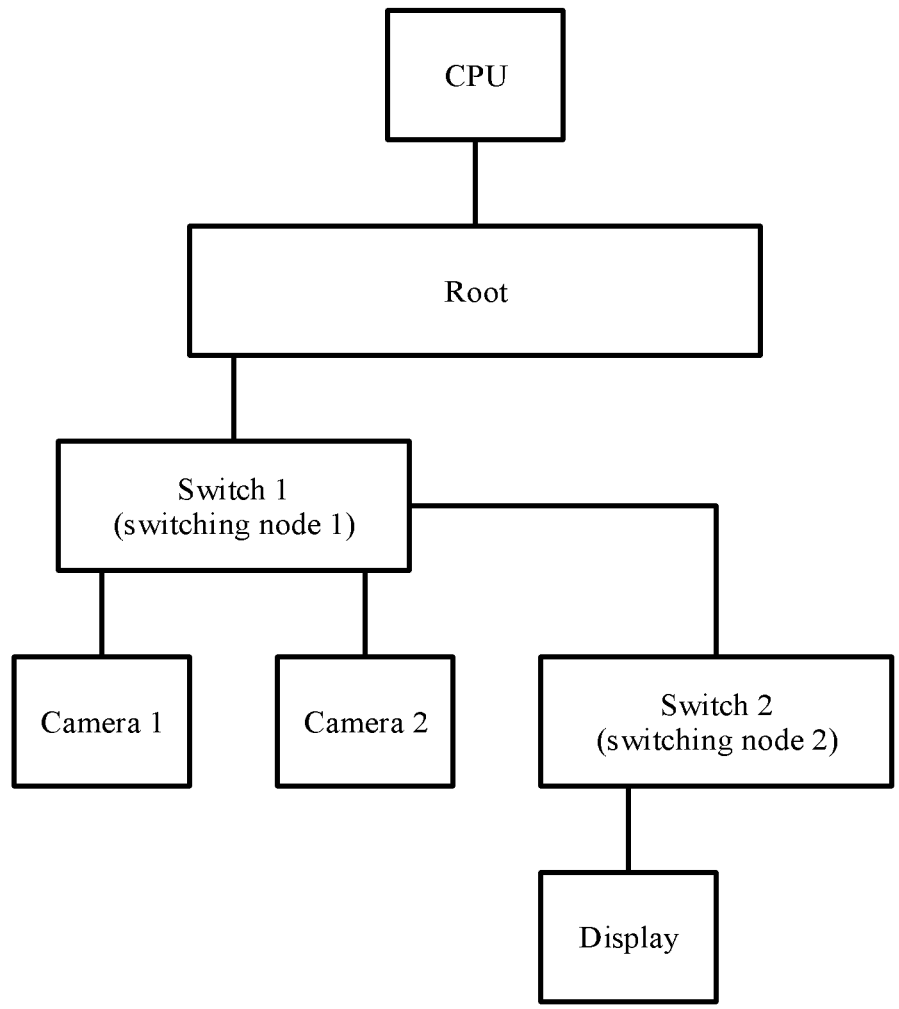
FIG. 10 is a schematic diagram of a PCIe system according to this disclosure.
Figure 11:
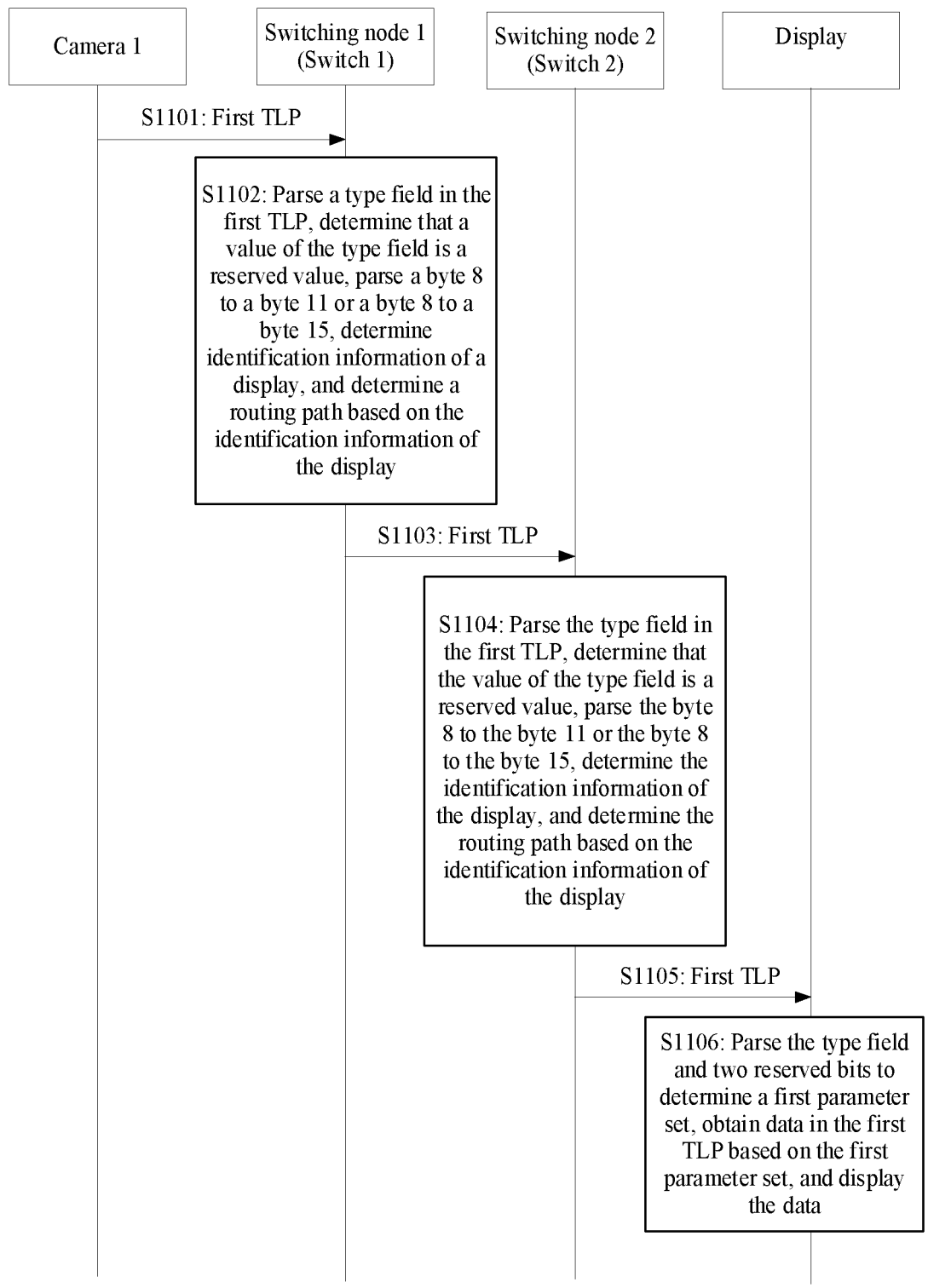
FIG. 11 is a specific flowchart in which an image shot by a camera 1 is displayed on a display according to this disclosure.

As shown in FIG. 10, a camera 1 or a camera 2 is connected to a switch 1, and a display is connected to a switch 2. An image shot by the camera 1 or the camera 2 needs to be displayed on the display. The PCIe-based data transmission method provided in this disclosure is described below by using an example in which an image shot by the camera 1 is displayed on the display, as shown in FIG. 11.

S1101: The camera 1 sends a first TLP to the switch 1.

A type field and two reserved bits in the first TLP are filled with 0000100, and 0000100 indicates a first parameter set. The first parameter set includes resolution of 2K, a pixel quantization depth of 24 bits, an image data type of RGB, and segment indication information of even segmentation, and three TLPs are used to transmit one row of images. The type field and the two reserved bits are jointly coded. First five bits correspond to the type field, a value of the type field is a reserved value, last two bits correspond to the two reserved bits, and a data type is image.

In addition, a byte 8 to a byte 11 or a byte 8 to a byte 15 in the first TLP are filled with identification information of the camera 1 and identification information of the display.

S1102: After the switch 1 receives the first TLP from the camera 1, the switch 1 parses the type field in the first TLP, determines that the value of the type field is a reserved value, parses the byte 8 to the byte 11 or the byte 8 to the byte 15, determines the identification information of the display, and determines a routing path based on the identification information of the display.

It should be understood that, if the switching node parses the type field and the value of the type field is not a reserved value, that is, the type field indicates an original PCIe type, processing is performed according to an original PCIe mechanism.

S1103: The switch 1 forwards the first TLP to the switch 2 through the routing path.

It is assumed herein that a TLP forwarded by the switch 1 to the switch 2 is the same as a TLP sent by the camera 1 to the switch 1. Alternatively, a TLP forwarded by the switch 1 to the switch 2 may be different from a TLP sent by the camera 1 to the switch 1. To be specific, the switch 1 may modify the identification information of the camera 1 in the first TLP to identification information of the switch 1. In this example, it is assumed that neither the switch 1 nor the switch 2 modifies the first TLP.

S1104: After the switch 2 receives the first TLP from the switch 1, the switch 2 parses the type field in the first TLP, determines that the value of the type field is a reserved value, parses the byte 8 to the byte 11 or the byte 8 to the byte 15, determines the identification information of the display, and determines the routing path based on the identification information of the display.

S1105: The switch 2 forwards the first TLP to the display through the routing path.

S1106: After the display receives the first TLP from the switch 2, the display parses the type field and the two reserved bits to determine the first parameter set. To be specific, the display learns, according to an agreement, that 0000100 indicates that the resolution is 2K, the pixel quantization depth is 24 bits, the image data type is RGB, the segment indication information includes even segmentation, and three TLPs are used to transmit one row of images. The display obtains data in the first TLP based on the first parameter set, and displays the data.

Therefore, in example 1, the type field and the two reserved bits are jointly coded to indicate that the data type is image and indicate an attribute parameter corresponding to the data type being image, so that the camera 1 and the display in a PCIe system can communicate with each other without using a root.

Example 2

As shown in FIG. 12, a type field indicates that a data type is security, and a reserved bit indicates a message type. For example, the message type may be an authentication message or a cryptographic message.

In the foregoing embodiments provided in this disclosure, various solutions of the communication method provided in embodiments of this disclosure are separately described from perspectives of each node and interaction between nodes. It may be understood that, to implement the foregoing functions, each node such as an endpoint or a switching node includes a corresponding hardware structure and/or software module for performing each function. A person skilled in the art should easily be aware that, in combination with units and algorithm steps of the examples described in embodiments disclosed in this specification, this disclosure can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this disclosure.

Figure 13:
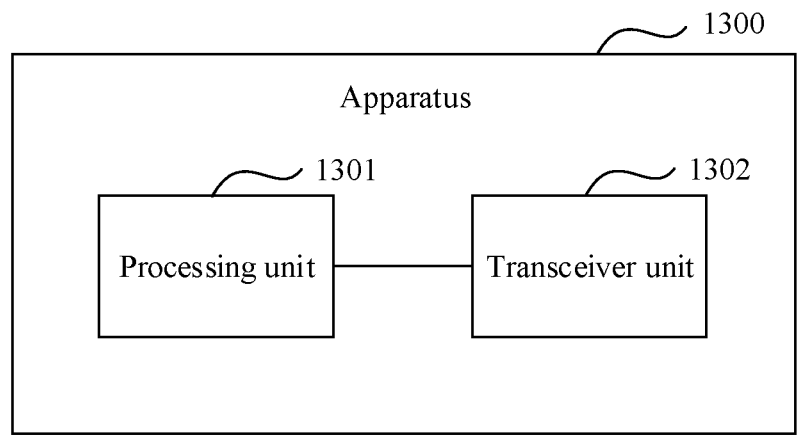
FIG. 13 is a first schematic diagram of a structure of an apparatus according to this disclosure.

Same as the foregoing idea, as shown in FIG. 13, an embodiment of this disclosure further provides an apparatus 1300. The apparatus 1300 includes a transceiver unit 1302 and a processing unit 1301.

In an example, the apparatus 1300 is configured to implement a function of the first node in the foregoing method. The apparatus may be the first node, or may be an apparatus in the first node, for example, a chip system.

The processing unit 1301 is configured to obtain a TLP, where the TLP includes data, a type field, and at least one reserved bit, the type field and the at least one reserved bit indicate a first parameter set, and the first parameter set includes a data type of the data.

The transceiver unit 1302 is configured to send the TLP to a second node.

In an example, the apparatus 1300 is configured to implement a function of the switching node in the foregoing method. The apparatus may be the switching node, or may be an apparatus in the switching node, for example, a chip system.

The transceiver unit 1302 is configured to receive a first TLP, where the first TLP includes data, a type field, and at least one reserved bit, the type field and the at least one reserved bit indicate a first parameter set, and the first parameter set includes a data type of the data.

The processing unit 1301 is configured to send a second TLP to a target node of the first TLP based on the first TLP, where the second TLP includes content of the data or the data.

In an example, the apparatus 1300 is configured to implement a function of the second node in the foregoing method. The apparatus may be the second node, or may be an apparatus in the second node, for example, a chip system.

The transceiver unit 1302 is configured to receive a TLP from a first node, where the TLP includes data, a type field, and at least one reserved bit, the type field and the at least one reserved bit indicate a first parameter set, and the first parameter set includes a data type of the data.

The processing unit 1301 is configured to obtain the data in the TLP based on the first parameter set.

For specific execution processes of the processing unit 1301 and the transceiver unit 1302, refer to the descriptions in the foregoing method embodiments. Division into modules in embodiments of this disclosure is an example, and is merely logical function division. During actual implementation, there may be another division manner. In addition, functional modules in embodiments of this disclosure may be integrated into one processor, or each of the modules may exist alone physically, or two or more modules may be integrated into one module. The integrated module may be implemented in a form of hardware, or may be implemented in a form of a software functional module.

In another optional variation, the apparatus may be a chip system. In this embodiment of this disclosure, the chip system may include a chip, or may include the chip and another discrete component. For example, the apparatus includes a processor and an interface circuit. The interface circuit is configured to receive code instructions and transmit the code instructions to the processor. The processor runs the code instructions to perform the methods in the foregoing embodiments. The processor implements functions of the processing unit 1301, and the interface circuit implements functions of the transceiver unit 1302.

Figure 14:
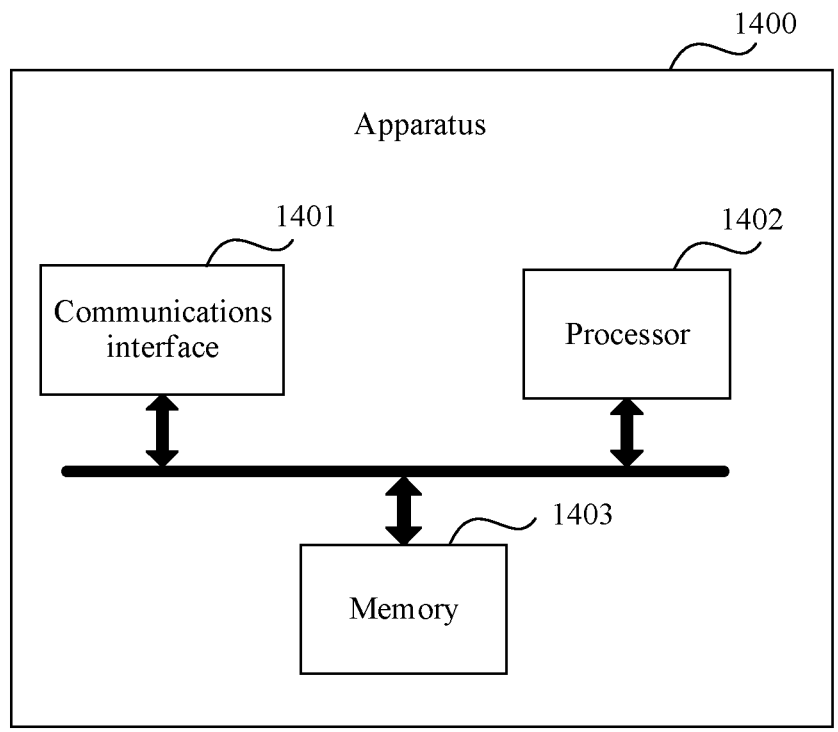
FIG. 14 is a second schematic diagram of a structure of an apparatus according to this disclosure.

Same as the foregoing idea, as shown in FIG. 14, an embodiment of this disclosure further provides an apparatus 1400. The apparatus 1400 includes a communications interface 1401, at least one processor 1402, and at least one memory 1403. The communications interface 1401 is configured to communicate with another device through a transmission medium, so that an apparatus in the apparatus 1400 can communicate with the other device. The memory 1403 is configured to store a computer program. The processor 1402 invokes the computer program stored in the memory 1403, to send and receive data through the communications interface 1401, to implement the method in the foregoing embodiment.

For example, when the apparatus is a first node, the memory 1403 is configured to store a computer program, and the processor 1402 invokes the computer program stored in the memory 1403, to perform, through the communications interface 1401, the method performed by the first node in the foregoing embodiments. When the apparatus is a switching node, the memory 1403 is configured to store a computer program, and the processor 1402 invokes the computer program stored in the memory 1403, to perform, through the communications interface 1401, the method performed by the switching node in the foregoing embodiments. When the apparatus is a second node, the memory 1403 is configured to store a computer program, and the processor 1402 invokes the computer program stored in the memory 1403, to perform, through the communications interface 1401, the method performed by the second node in the foregoing embodiments.

In this embodiment of this disclosure, the communications interface 1401 may be a transceiver, a circuit, a bus, a module, or a communications interface of another type. The processor 1402 may be a general-purpose processor, a digital signal processor, an application-specific integrated circuit, a field programmable gate array or another programmable logic device, a discrete gate or a transistor logic device, or a discrete hardware component, and may implement or perform the methods, steps, and logical block diagrams disclosed in embodiments of this disclosure. The general-purpose processor may be a microprocessor, any conventional processor, or the like. The steps of the method disclosed with reference to embodiments of this disclosure may be directly performed by a hardware processor, or may be performed by using a combination of hardware in the processor and a software module. The memory 1403 may be a nonvolatile memory, for example, a hard disk drive (HDD) or a solid-state drive (SSD), or may be a volatile memory, for example, a RAM. The memory is any other medium that can carry or store expected program code in a form of an instruction or a data structure and that can be accessed by a computer, but is not limited thereto. The memory in this embodiment of this disclosure may alternatively be a circuit or any other apparatus that can implement a storage function. The memory 1403 is coupled to the processor 1402. Coupling in this embodiment of this disclosure is indirect coupling or a communication connection between apparatuses, units, or modules, may be in an electrical form, a mechanical form, or another form, and is used for information exchange between the apparatuses, the units, or the modules. In another implementation, the memory 1403 may alternatively be located outside the apparatus 1400. The processor 1402 may operate in collaboration with the memory 1403. The processor 1402 may execute program instructions stored in the memory 1403. At least one of the at least one memory 1403 may alternatively be included in the processor 1402. A specific connection medium between the communications interface 1401, the processor 1402, and the memory 1403 is not limited in this embodiment of this disclosure. For example, in this embodiment of this disclosure, the memory 1403, the processor 1402, and the communications interface 1401 may be connected through a bus in FIG. 14. The bus may be classified into an address bus, a data bus, a control bus, or the like.

It may be understood that the apparatus in the embodiment shown in FIG. 13 may be implemented by the apparatus 1400 shown in FIG. 14. Further, the processing unit 1301 may be implemented by the processor 1402, and the transceiver unit 1302 may be implemented by the communications interface 1401.

An embodiment of this disclosure further provides a computer-readable storage medium. The computer-readable storage medium stores a computer program or instructions. When the computer program or the instructions are run on a computer, the computer is enabled to perform the method in the foregoing embodiments.

All or some of the methods in embodiments of this disclosure may be implemented by using software, hardware, firmware, or any combination thereof. When software is used to implement the embodiments, the embodiments may be implemented entirely or partially in a form of a computer program product. The computer program product includes one or more computer instructions. When the computer program instructions are loaded and executed on a computer, the procedures or functions according to embodiments of this disclosure are all or partially generated. The computer may be a general-purpose computer, a special-purpose computer, a computer network, a network device, user equipment, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DIGITAL VERSATILE DISC (DVD)), a semiconductor medium (for example, a solid-state drive (SSD)), or the like.

As described above, the foregoing embodiments are merely intended to describe the technical solutions of this disclosure in detail. However, descriptions in the foregoing embodiments are merely used to help understand the methods in embodiments of this disclosure, but should not be construed as a limitation on embodiments of this disclosure. Any variation or replacement readily figured out by a person skilled in the art shall fall within the protection scope of embodiments of this disclosure.

What is claimed is:

1. A Peripheral Component Interconnect Express (PCIe)-based data transmission method, wherein the PCIe-based data transmission method comprises:
   obtaining, by a first node, a transaction layer packet (TLP) comprising data, a type field, and at least one reserved bit, wherein the type field and the at least one reserved bit indicate a first parameter set, and wherein the first parameter set comprises:
   a data type of the data;
   a pixel quantization depth when the data type indicates image data;
   a quantization depth when the data type indicates audio data;
   interface information when the data type indicates control-type information;
   a message type when the data type indicates security data; and
   an alignment manner when the data type indicates SWRITE data; and
   sending, to a second node, the TLP.

2. The PCIe-based data transmission method of claim 1, wherein the first parameter set further comprises one or more first attribute parameters corresponding to the data type.

3. The PCIe-based data transmission method of claim 2, further comprising separately coding the type field and the at least one reserved bit, wherein a first parameter indicated by the type field is different from a second parameter indicated by the at least one reserved bit.

4. The PCIe-based data transmission method of claim 1, further comprising jointly coding the type field and the at least one reserved bit, wherein the type field and the at least one reserved bit jointly indicate the first parameter set.

5. The PCIe-based data transmission method of claim 1, wherein the type field comprises a reserved value.

6. The PCIe-based data transmission method of claim 1, wherein the TLP packet further comprises a TLP header, wherein a plurality of bytes in a range from byte 4 to byte 11 of the TLP header indicate a second parameter set, and wherein the second parameter set comprises one or more second attribute parameters corresponding to the data type.

7. The PCIe-based data transmission method of claim 1, wherein the first node is a first endpoint, and wherein the second node is a second endpoint.

8. A Peripheral Component Interconnect Express (PCIe)-based data transmission method, wherein the PCIe-based data transmission method comprises:
   receiving a first transaction layer packet (TLP) comprising data, a type field, and at least one reserved bit, wherein the type field and the at least one reserved bit indicate a first parameter set, and wherein the first parameter set comprises:
   a data type of the data;
   a pixel quantization depth when the data type indicates image data;
   a quantization depth when the data type indicates audio data;
   interface information when the data type indicates control-type information;
   a message type when the data type indicates security data; and
   an alignment manner when the data type indicates SWRITE data; and
   sending, to a target node of the first TLP based on the first TLP, a second TLP comprising the data.

9. The PCIe-based data transmission method of claim 8, wherein the first parameter set further comprises one or more first attribute parameters corresponding to the data type.

10. The PCIe-based data transmission method of claim 9, further comprising separately coding the type field and the at least one reserved bit, wherein a first parameter indicated by the type field is different from a second parameter indicated by the at least one reserved bit.

11. The PCIe-based data transmission method of claim 8, wherein the type field and the at least one reserved bit are jointly coded, and wherein the type field and the at least one reserved bit jointly indicate the first parameter set.

12. The PCIe-based data transmission method of claim 8, wherein a value of the type field is a reserved value.

13. The PCIe-based data transmission method of claim 8, wherein the TLP packet further comprises a TLP header, wherein bytes within a range of byte 4 to byte 11 of the TLP header indicate a second parameter set, and wherein the second parameter set comprises one or more second attribute parameters corresponding to the data type.

14. A communications apparatus comprising:
   a processor configured to obtain a transaction layer packet (TLP) comprising data, a type field, and at least one reserved bit, wherein the type field and the at least one reserved bit indicate a first parameter set, and wherein the first parameter set comprises:
   a data type of the data;
   a pixel quantization depth when the data type indicates image data;
   a quantization depth when the data type indicates audio data;
   interface information when the data type indicates control-type information;
   a message type when the data type indicates security data; and an alignment manner when the data type indicates SWRITE data; and a communications interface coupled to the processor and configured to send, to a second node, the TLP.

15. The PCIe-based data transmission method of claim 1, wherein the TLP packet further comprises a 16 byte TLP header, wherein a plurality of bytes in a range of byte 4 to byte 15 of the TLP header indicate a second parameter set, and wherein the second parameter set comprises one or more second attribute parameters corresponding to the data type.

16. The PCIe-based data transmission method of claim 1, wherein the first node is an endpoint, and wherein the second node is a switching node.

17. The PCIe-based data transmission method of claim 1, wherein the first node is a first switching node, and wherein the second node is a second switching node.

18. The PCIe-based data transmission method of claim 8, wherein the TLP packet further comprises a 16 byte TLP header, wherein a plurality of bytes in a range of byte 4 to byte 15 of the TLP header indicate a second parameter set, and wherein the second parameter set comprises one or more second attribute parameters corresponding to the data type.

19. The method of claim 1, wherein the message type comprises an authentication type when the data type indicates security data.

20. The method of claim 8, wherein the message type comprises a cryptographic type when the data type indicates security data.

* * * * *